(No Model.)

J. G. SMITH.
EXTENSION SCREEN FOR OPEN GRATES AND FIRE PLACES.

No. 363,178. Patented May 17, 1887.

WITNESSES
Phille Masi.
Theo. Munger.

INVENTOR
J. G. Smith
By Anderson Smith
Attorneys

N. PETERS, Photo-Lithographer, Washington, D. C.

UNITED STATES PATENT OFFICE.

JAMES G. SMITH, OF CLEVELAND, OHIO.

EXTENSION-SCREEN FOR OPEN GRATES AND FIRE-PLACES.

SPECIFICATION forming part of Letters Patent No. 363,178, dated May 17, 1887.

Application filed November 27, 1886. Serial No. 220,047. (No model.)

*To all whom it may concern:*

Be it known that I, JAMES G. SMITH, a citizen of the United States, and a resident of Cleveland, in the county of Cuyahoga and State of Ohio, have invented certain new and useful Improvements in Extension-Screens for Open Grates and Fire-Places; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
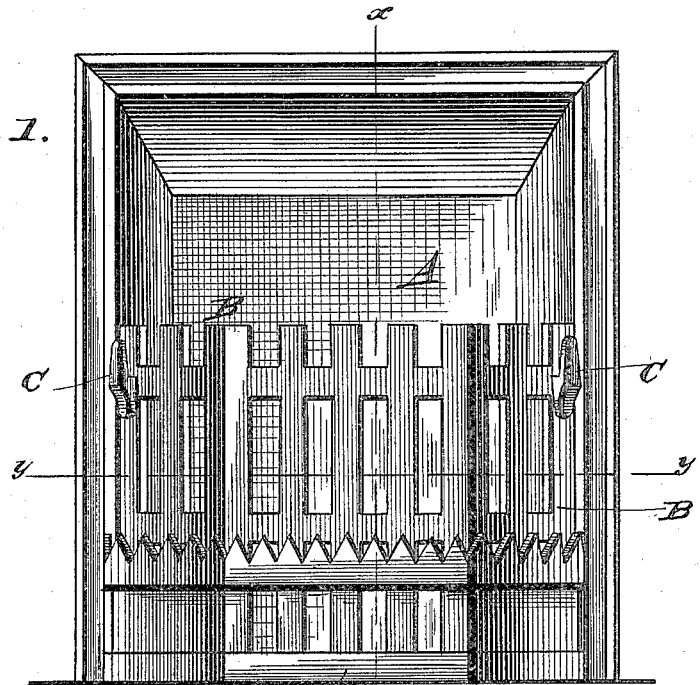
Figure 2:
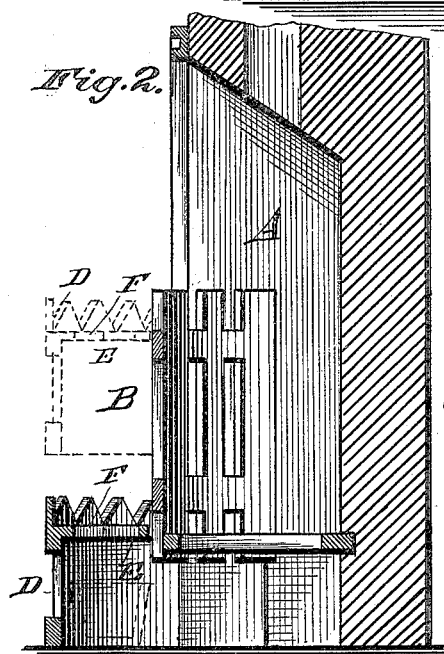
Figure 3:
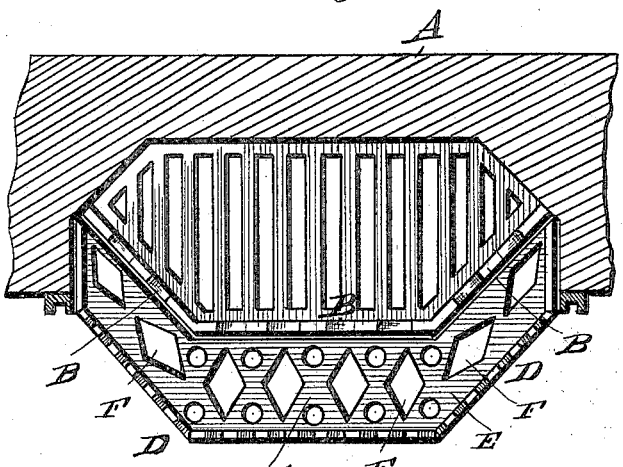
Figure 4:
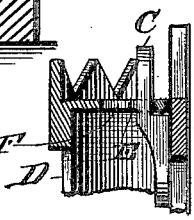

Figure 1 of the drawings is a representation of a front elevation. Fig. 2 is a vertical section on line $x\ x$ Fig. 1. Fig. 3 is a horizontal section on line $y\ y$ Fig. 1. Fig. 4 is a detail sectional view.

My invention relates to fire-places, open stoves, or other heating or cooking stoves, requiring ash-pit, ash-pan, or other similar receptacle for ashes; and it consists in the construction and novel combination of parts, as hereinafter described, and pointed out in the claim.

The invention has for its objects cleanliness and convenience in use, and the improvement has especial reference to screens for grates, ash-pits, and pans of stoves; and it consists of a screen provided with a projection or back extension having openings for the free passage of the ashes that drop from the front of the front grate into the ash-pit or ash-pan out of sight, instead of falling in sight, as in other screens, to the fender or hearth below, and said screen is provided with a front grate having hooks or the like attached to any convenient place for hanging said screen upon when it is desired that said screen shall be removed out of the way for cleaning or other purposes and for the removal of the ash-pan. Said hooks, when desired or required, may be attached to the frame, or to the front or jambs of a stove, or other convenient place to accomplish the end set forth. The said extension-screen may also be used, when desired or required, separate and independent before any front grate or stove where the said hooks are dispensed with or not used.

Referring by letter to the accompanying drawings, A designates an open fire-place, of any of the kinds above referred to, requiring an ash pit or pan.

B designates an extension-screen which extends across in front of the fire-pot.

C C designate hooks projecting from the front of the front grate.

D designates a screen, which is provided with a projection or back extension, E, having openings F, for the free passage of the ashes that drop from the front grate into the ash-pit or ash-pan out of sight, instead of falling in sight, as in other screens, to the fender or hearth below. This extension or projecting screen is designed to be placed upon the hearth and close the interval below the fire-grate, so that any coal or ashes which may fall from the fire will drop through the perforated rear extension or horizontal portion and be hidden from view.

Having described this invention, what I claim, and desire to secure by Letters Patent, is—

The combination of the fire-place, the elevated grate and front therein, formed with the hooks C C, and the removable projecting screen resting on the hearth in front of the open space under the grate, and formed with the perforated rearward extension covering the interval between the screen and front, as set forth.

In testimony whereof I affix my signature in presence of two witnesses.

JAMES G. SMITH.

Witnesses:
   I. F. SMITH,
   FRANK N. WILCOX.